US010800573B2

(12) United States Patent
Riva

(10) Patent No.: US 10,800,573 B2
(45) Date of Patent: Oct. 13, 2020

(54) APPARATUS AND METHOD FOR CLOSING A PACKAGE WITH A MOVABLE POURING SPOUT

(71) Applicant: TACOM S.A., Magliaso (CH)

(72) Inventor: Francesco Riva, Vernate (CH)

(73) Assignee: TACOM S.A., Magliaso (CH)

( * ) Notice: Subject to any disclaimer, the term of this patent is extended or adjusted under 35 U.S.C. 154(b) by 194 days.

(21) Appl. No.: 15/820,998

(22) Filed: Nov. 22, 2017

(65) Prior Publication Data
US 2018/0155077 A1 Jun. 7, 2018

(30) Foreign Application Priority Data
Nov. 22, 2016 (IT) .......................... 102016000117594

(51) Int. Cl.
B65D 5/74 (2006.01)
B65B 7/28 (2006.01)
(Continued)

(52) U.S. Cl.
CPC .......... B65D 5/742 (2013.01); B29C 65/7838 (2013.01); B29C 66/63 (2013.01); B31B 50/46 (2017.08); B31B 50/732 (2017.08); B65B 7/16 (2013.01); B65B 7/20 (2013.01); B65B 7/2864 (2013.01); B65B 49/08 (2013.01); B65B 51/023 (2013.01); B65B 57/04 (2013.01); B65D 5/745 (2013.01); B29L 2031/7166 (2013.01); B65B 2210/04 (2013.01)

(58) Field of Classification Search
CPC ...... B65D 5/742; B65D 5/745; B65B 7/2864; B65B 7/16; B65B 49/08; B65B 7/20; B65B 51/023; B65B 57/04; B65B 2210/04; B29C 65/7838; B29C 66/63; B29L 2031/7166; B31B 50/732; B31B 50/46

USPC ............................ 229/214–219, 248, 125.04
See application file for complete search history.

(56) References Cited

U.S. PATENT DOCUMENTS 3,123,275 A * 3/1964 Bunger .................. B65D 5/745
229/248
4,505,694 A * 3/1985 Okushita ................ B65D 5/606
493/101
(Continued)

FOREIGN PATENT DOCUMENTS

JP 3388593 B2 * 3/2003 ............. B65D 5/746
JP 3388593 B2 3/2003

OTHER PUBLICATIONS

Search Report and Written Opinion issued by the Italian Patent and Trademark Office in connection with corresponding Italian Application No. 102016000117594, dated Jul. 26, 2017.

Primary Examiner — Nathan J Newhouse
Assistant Examiner — Matthew T Theis
(74) Attorney, Agent, or Firm — Meunier Carlin & Curfman LLC

(57) ABSTRACT

For closing packages (9) provided with a movable pouring spout, an adhesive is applied to one or both portions of a first pair of folding portions (16) which are movable integrally with an inclined wall (14) of a chamfered corner (10) of the package (9). The first folding portions (16) may be coupled to a second pair of folding portions (18), which are movable integrally with an oscillatable tongue (12) of the spout. The adhesive adheres the second portions (18) to the first portions (16) when the tongue (12) moves toward the inclined wall (14).

15 Claims, 6 Drawing Sheets

(51) Int. Cl.
*B29C 65/78* (2006.01)
*B31B 50/46* (2017.01)
*B31B 50/73* (2017.01)
*B29C 65/00* (2006.01)
*B65B 57/04* (2006.01)
*B65B 49/08* (2006.01)
*B65B 7/16* (2006.01)
*B65B 51/02* (2006.01)
*B65B 7/20* (2006.01)
*B29L 31/00* (2006.01)

(56) References Cited

U.S. PATENT DOCUMENTS

| | | | | |
|---|---|---|---|---|
| 6,419,151 B1* | 7/2002 | Urtubey | ............ | B65D 5/745 |
| | | | | 229/125.42 |
| 2009/0149306 A1* | 6/2009 | Durand | ............ | B65B 5/024 |
| | | | | 493/355 |
| 2011/0154779 A1* | 6/2011 | Baba | ............ | B29C 65/02 |
| | | | | 53/111 R |

* cited by examiner

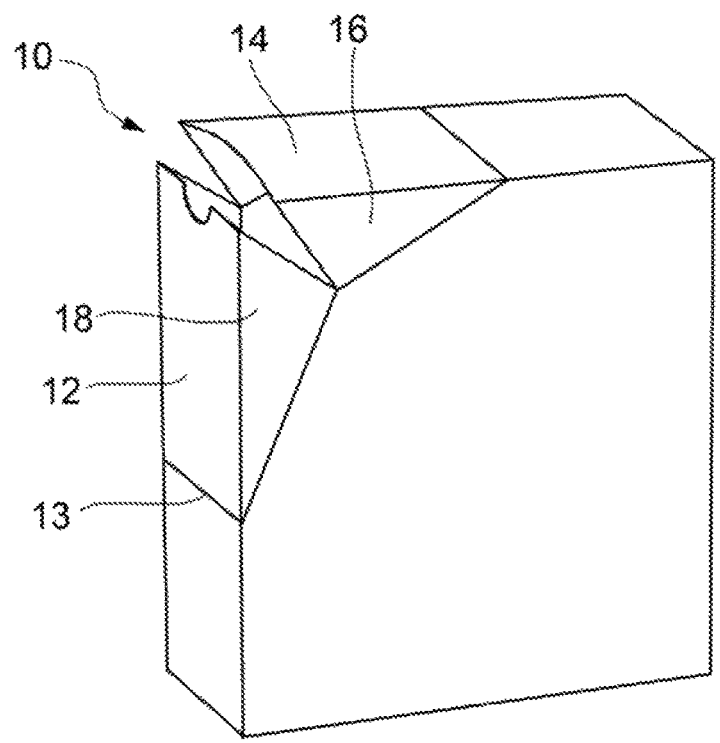
FIG.1A (PRIOR ART)
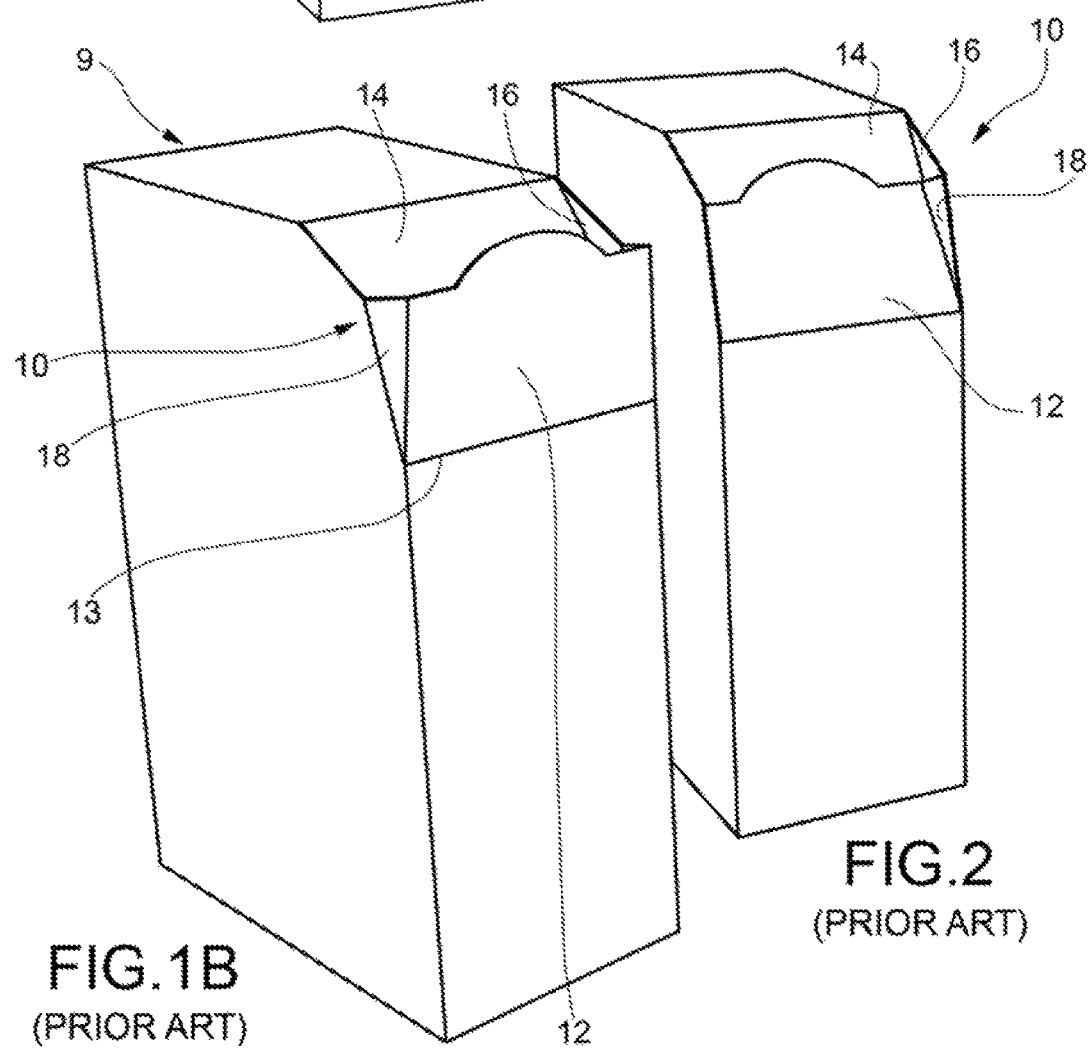
FIG.1B (PRIOR ART)
FIG.2 (PRIOR ART)

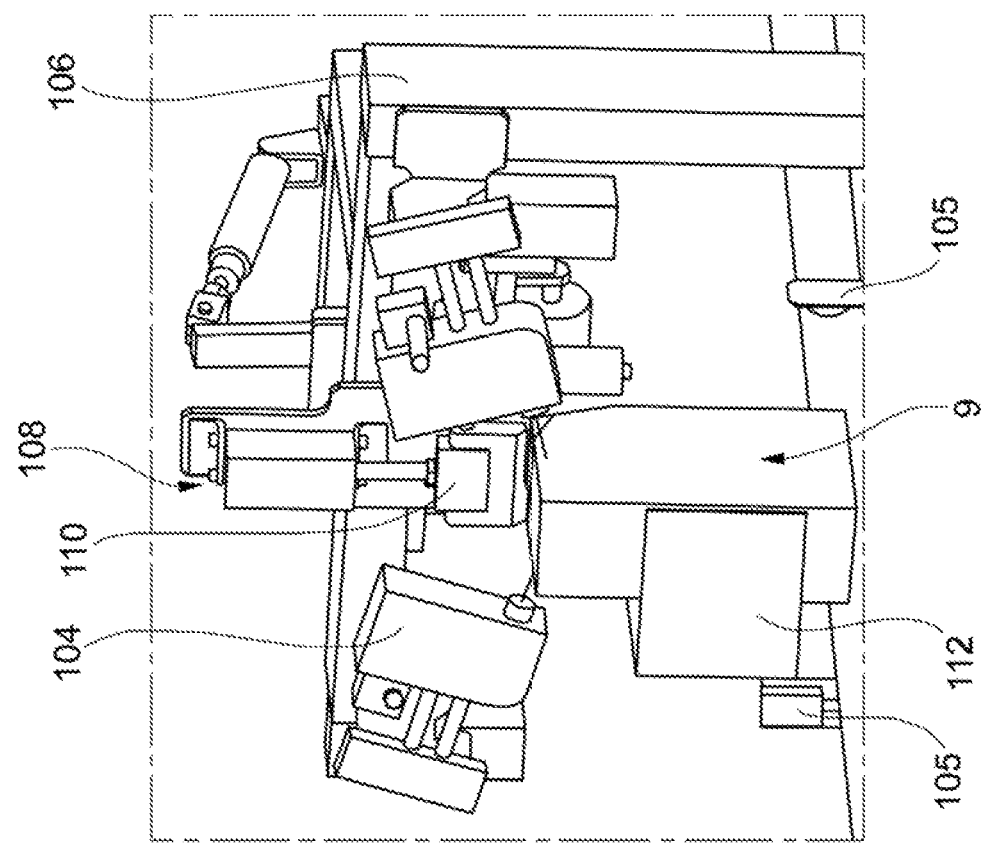
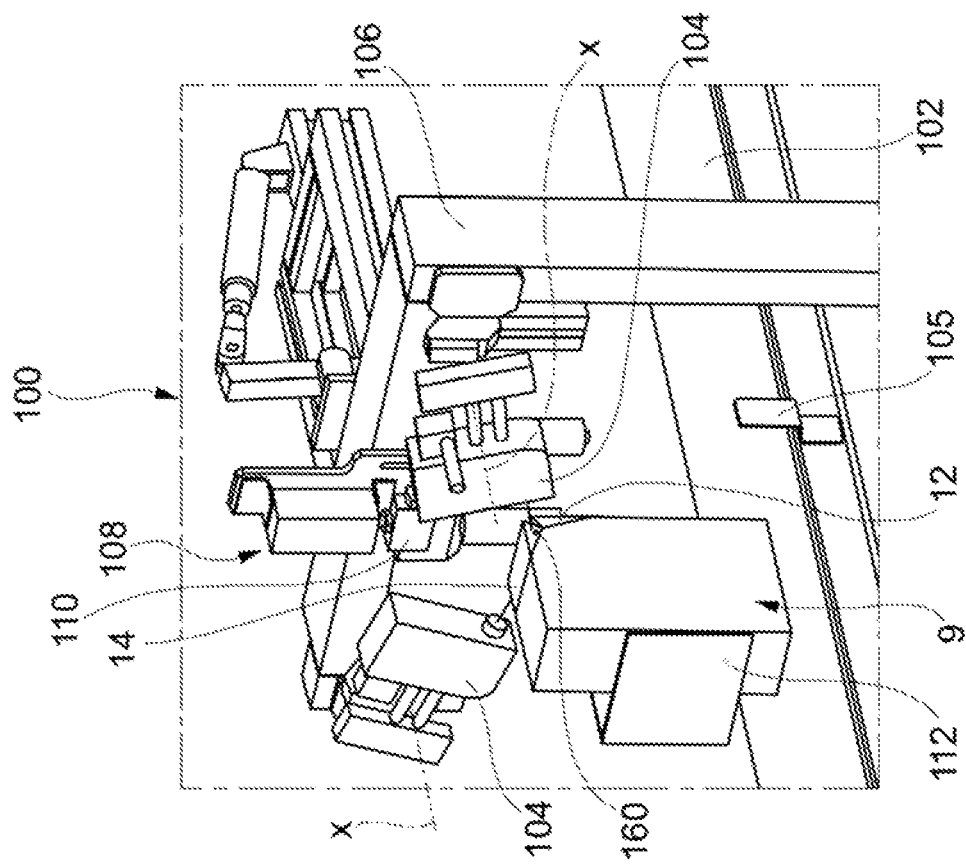

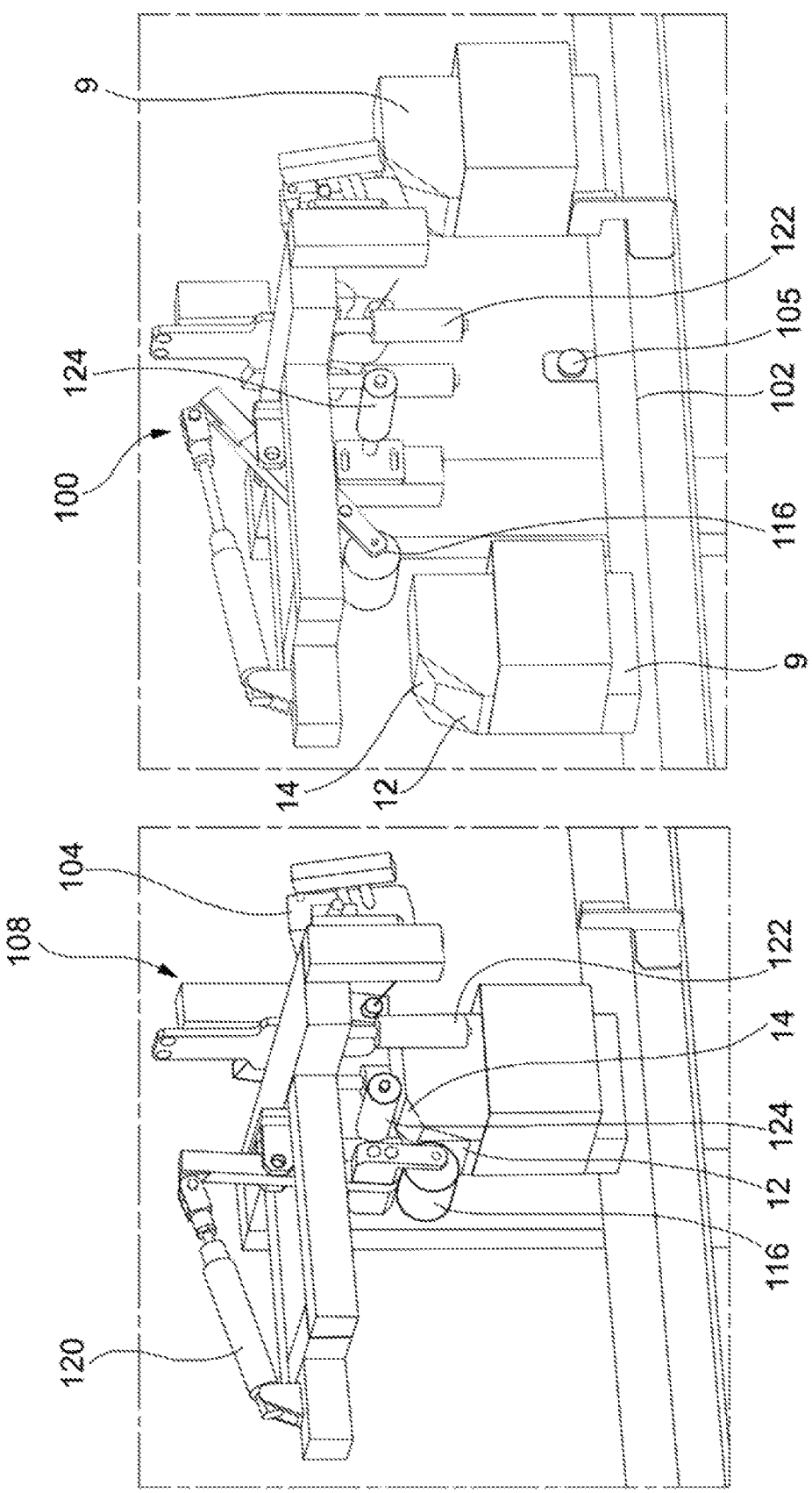

APPARATUS AND METHOD FOR CLOSING A PACKAGE WITH A MOVABLE POURING SPOUT

TECHNICAL SECTOR

The present invention is generally in the field of industrial automation; in particular, the invention relates to an apparatus and a method for closing a package provided with a movable pouring spout.

PRIOR ART

Containers or packages for loose materials (in particular liquid, granular or powdered materials) are known, provided with a movable pouring spout between two opening and closing positions. Such containers have a chamfered corner or angle in which there is a oscillatable tongue between an open position, wherein the contents may be poured into the package, and a closed position, wherein the tongue abuts against an inclined wall preventing the content from escaping.

An example of a package of the aforementioned type is known from the document U.S. Pat. No. 6,419,151 B1, wherein substantially triangular folding portions extend outwards when the spout is in the open position, and fold towards the inside of the box (i.e., to the inclined wall), when the tongue returns to its position against the sloping wall.

In particular, as may be seen in FIGS. 1A, 1B and 2, the folding portions comprise a first pair of folding portions 16, movable integrally with the inclined wall 14, and a second pair of folding portions 18, which are movable integrally with the tongue 12, so that the folding portions fold back onto the inclined wall when the tongue moves toward the inclined wall (FIG. 2).

Traditionally, an adhesive layer is applied to the inclined wall, which, when the spout tongue is folded in its closed position against the inclined wall, assures the adhesion between the tongue and the inclined wall.

However, such a procedure involves a precarious closure of the package, as the triangular folding portions do not adhere perfectly to each other, leaving gaps from which the contents of the package may leak.

In addition, a closing method according to the prior art is laborious, and requires complex instrumentation, as will be apparent from the following.

FIGS. 3A to 3C illustrate, by way of example, a process for closing a package, according to the prior art. In particular, it is noted that a number of packages are transported along an inclined belt toward a closing station, wherein there are three tools by means of which the steps for closing the package are carried out. The arrows in the drawings show schematically the direction of movement of the various components.

In particular, FIG. 3A shows a first step of applying the adhesive layer on the outside of the surface that becomes the sloping wall of the chamfered corner. Such step is generally performed by lowering an applicator, which approaches the package and deposits the adhesive material.

At the same time or subsequently, packages are slid forward toward a first blade that lowers and, following the package, engages the portion on which the adhesive layer has been applied. The first blade folds down such portion so as to give it a certain inclination. Once the operation is completed, the first blade retracts.

Finally, the package passes under a third blade, which, in turn, lowers and, following the package, engages the tongue of the spout, so as to fold it back inside the carton and place it in abutment with the inclined wall obtained in the previous step. When the operation is completed, the third blade also retracts.

However, a process such as the one just described above involves a number of drawbacks. First, there is the risk that the descent of the punch for applying the adhesive material on the inclined wall will cause a bulge or deformation of the package. Additionally, the same risk of damage to the box requires that the subsequent tools follow the package rather than impacting it frontally. This involves the adoption of a complex system, as the tools must descend after the package has passed, following it and grazing the rear edge to fold the various portions of the chamfered corner. Otherwise, due to the system configuration, the head-on collision with the rigid tool could cause a deformation of the box.

Such limitations, understandably, may affect the quality and finishing of the product, adversely affecting the performance of the automatic production line.

SUMMARY OF THE INVENTION

One object of the present invention is to remedy the aforementioned problems.

To achieve this, an automated method for closing packages having a movable spout comprises the step of applying a glue or other adhesive material (preferably in a substantially punctiform way) on one or both portions of the first pair of folding portions, preferably when the sloping wall has not yet been folded inwards into the chamfered corner. In such a configuration, the first folding portions of the package have faces facing outwardly, and on these faces the adhesive is appropriately applied.

Thus, when the inclined wall is folded inside the package, such first pair of folding portions will also fold inside the package, and the faces with the adhesive, which were originally directed towards the outside of the box, will now be directed toward the inside of the chamfered corner.

On the first folding portions, a second pair of folding portions will be engaged, which will remain bonded to the first pair by means of the adhesive material. By doing so, due to the perfect mutual adhesion between the folding portions, there will no longer be gaps from which the contents of the package may escape.

As will be better appreciated in the following description, the points of glue or adhesive may be applied to the package by means of dispensers mounted on an automatic closing station. The dispensers may apply the adhesive material by projecting it toward the box from a given distance, or releasing it by contact.

In this case, the dispensers may appropriately oscillate so as to close in on the side walls of the package at its passage through the automatic closing station, and/or move in a way so as to converge on the side walls of the box.

Subsequently, a shaped punch or actuator may descend on the inclined wall to cause it to fold towards the inside of the chamfer of the package.

Preferably, the punch is provided with a composite head capable of supporting the box profile so as not to hamper its sliding forward along the conveyor belt (unlike what was known in the prior art, wherein the folding blade was essentially rigid).

Finally, the process may include the step of passing the package below a biasing element (appropriately an oscillating roller) that folds the tongue of the spout inwardly into the chamfered corner, so as to cause it to abut against the inclined wall, made in the previous step. The counter element is optionally attached to an actuator, which causes it to lift up just after impacting the package. In this way, as the biasing element retracts immediately after hitting the box, the latter does not undergo any damage.

An apparatus and a simplified method are therefore provided for automatically closing a stream of packages having a movable spout, thus avoiding the problems of the prior art.

In particular, it is possible to guarantee a hermetically sealed closure of the package and, alternatively or in combination, it becomes possible for the folding tools to impact the package frontally, as they are provided with a certain elasticity. This is because both the punch that folds the inclined wall and the counter element that closes the tongue may be configured so as to touch the package without excessively countering the advancement motion.

Therefore, no bulging or deformation is generated, nor is resistance introduced in the advancement motion of the packages along the conveyor belt.

Such a configuration significantly simplifies the closing method of the package, as the traditionally complex mechanisms that coordinate the contact between the box and the folding tools, which are forced to follow the package rather than impact it frontally, are no longer required.

The aforementioned and other objects and advantages are achieved, according to an aspect of the invention, by an apparatus and a method having the features defined in the accompanying claims.

BRIEF DESCRIPTION OF THE DRAWINGS

The functional and structural features of some preferred embodiments of a method for closing a package equipped with a spout according to the invention will now be described. Reference is made to the accompanying drawings, wherein:

FIGS. 1A, 1B and 2 are two schematic perspective views of a package for bulk materials according to the prior art;

FIG. 4 is a schematic perspective view of an apparatus and a step of the method according to an embodiment of the present invention wherein a pair of dispensers are applying two points of adhesive material to the first pair of folding portions;

FIG. 5 is a schematic perspective view of the apparatus of FIG. 4 and of a step of the method according to an embodiment of the present invention following the step illustrated in FIG. 4, wherein an actuator slides vertically downwards, coming into contact with the package;

FIGS. 10 and 11 are schematic perspective views of two successive steps of the closing method according to an embodiment of the invention, wherein a counter element engages the tongue and folds it toward the inside of the chamfered corner the package, causing it to abut against the inclined wall, so that the package with the closed spout passes beyond the automatic closing station.

DETAILED DESCRIPTION

Figure 3A:
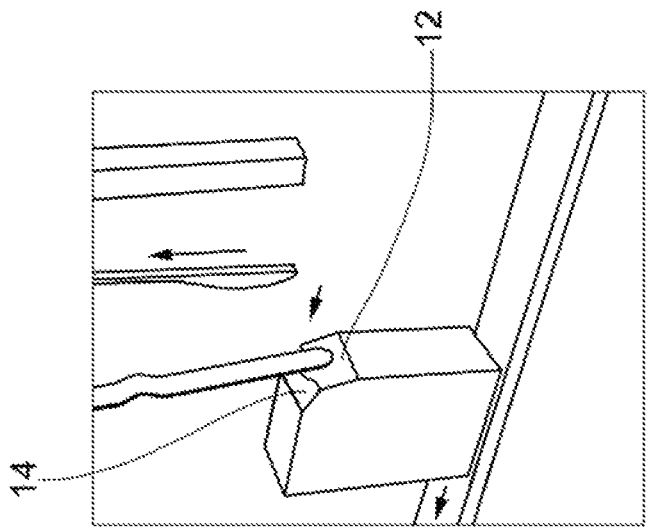
FIGS. 3A to 3C are schematic perspective views of three steps of an automatic closing method of a plurality of packages according to the prior art.
Figure 3B:
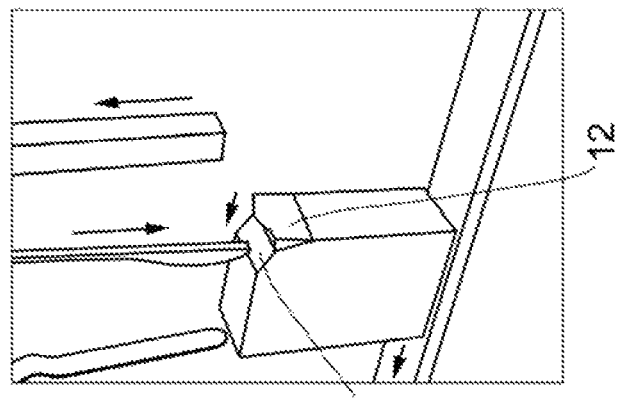
Figure 3C:
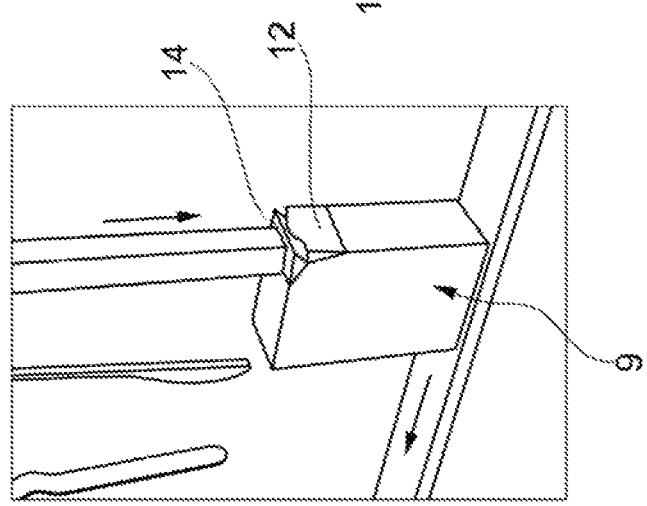

Before explaining in detail a plurality of embodiments of the invention, it should be clarified that the invention is not limited in its application to the details of construction and to the configuration of the components provided in the following description or illustrated in the drawings. The invention may assume other embodiments and may be implemented or achieved in essentially different ways. It should also be understood that the phraseology and terminology are for descriptive purposes and should not be construed as limiting.

Initially referring to FIG. 4, one or more packages 9 are conveyed, for example by means of a conveyor belt 102 (or other known conveyor means), to an automatic closing station 100.

A first step in a method according to the present invention is to apply an adhesive material 16a on at least one of a first pair of folding portions 16. Such material may appropriately be applied to an external face of at least one of the first folding portions 16. Appropriately, the adhesive material may be applied on both of the external faces of both of the first folding portions 16.

Due to the adhesive means applied in the aforementioned manner, the second folding portions 18 will adhere to the first folding portions 16 when the tongue 16 and the inclined wall 14 are folded to the inside of the chamfered corner 10.

Optionally, the adhesive material may be applied by contact or spraying by means of one or more dispensers 104, appropriately mounted on a support structure 106. Such support structure 106 is appropriately a portal structure with a cantilevered arm on which the dispensers 104 are mounted so that the package passes below the support structure and between the dispensers 104.

Preferably, the dispensers 104, two in number in the example shown, are located on two opposite sides with respect to the advancement path of the packages.

According to an alternative embodiment not shown, an additional adhesive point may be applied to the interface between the tongue 12 and the inclined wall 14.

According to one embodiment, the dispensers 104 may be oscillatable around their respective first axes X so as to approach or converge on the side walls of the package 9 when the latter passes between the dispensers. Alternatively or in combination, the dispensers 104 may travel along a transverse direction with respect to the direction of advancement of the package, so as to approach or move away from the side walls of the package.

Optionally, the dispensers 104 may be actuated by detecting the passage in the package through a photocell 105 or other detection means, for example, mechanical.

Appropriately, the apparatus and the method according to the invention comprise further steps and devices, hereinafter described by way of example.

During the first step of the method just described, an actuator 108 provided with a movable head 110 is held in a distal position with respect to the package 9.

FIG. 5 illustrates a second step of the method wherein the movable head of the actuator 108 is lowered when it is superimposed on, and corresponds to, the inclined wall 14, until it comes into contact with the latter (which, at this stage, is still in an undeformed state). The head 110 is lowered until it imparts to the inclined wall 14 the desired inclination toward the inside of the chamfered corner 10.

Optionally, the package 9 may be retained by means of a retainer or safety clamp 112 which assures correct positioning on the transport means 102.

Figure 6:
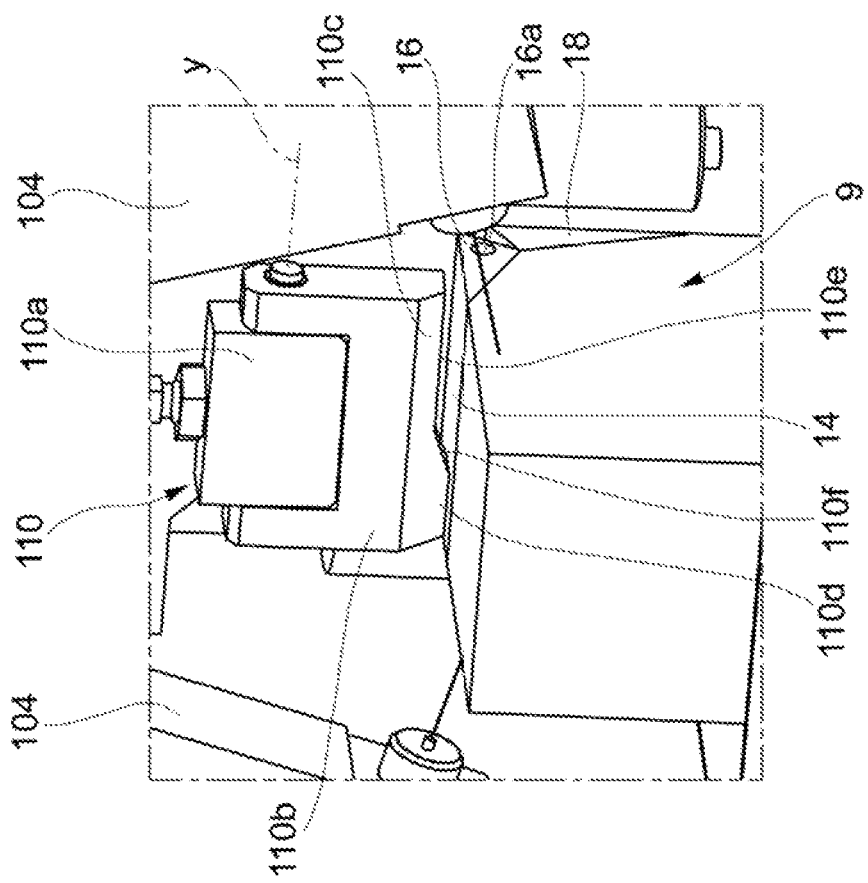

FIG. 6 shows a detail of the step shown in FIG. 5, wherein the head 110 of the actuator 108 comes in contact with the inclined wall 14. In particular, the zones 16*a* wherein the adhesive means has been applied to the outer faces of the first folding portions 16 may be seen, while it may be noted that the second folding portions 18 project outwardly from the package, holding a tongue 12 of a spout 10 in an open position (as will be better visible in FIG. 7).

It should also be noted that the head 110 of the actuator 108 is preferably composed of a fixed part 110*a*, integral with a movable rod of the actuator, and an oscillatable part 110*b* which may oscillate with respect to the fixed part 110*a* around a second Y axis, preferably horizontally or substantially horizontal or transverse with respect to the direction of advancement of the packages. The movable or oscillatable portion 110*b* is configured to fold in the direction of advancement of the package 9, limiting the action countering the advancement motion of such package. Also, preferably, an end portion 110*c* of the movable part 110*b* of the head 110 is chamfered or tapered toward the contact area with the inclined wall 14.

Even more preferably, as may be seen from FIG. 6, such tapered end portion 110*c* comprises two portions of different heights, so that the head 110 comes into contact with different points of the inclined wall 14 at different times.

At this stage, the inclined wall 14 is still coplanar with respect to a top face of the package 9.

In the example shown, the end portion 110*c* has a transversely elongated side appendage 110*d* protruding below an opposite and transversely elongated side portion 110*e*, which terminates higher than the side appendage 110*d*. The side appendage 110*d* and the side portion 110*e* may be joined by an inclined portion 110*f*.

Figure 7:
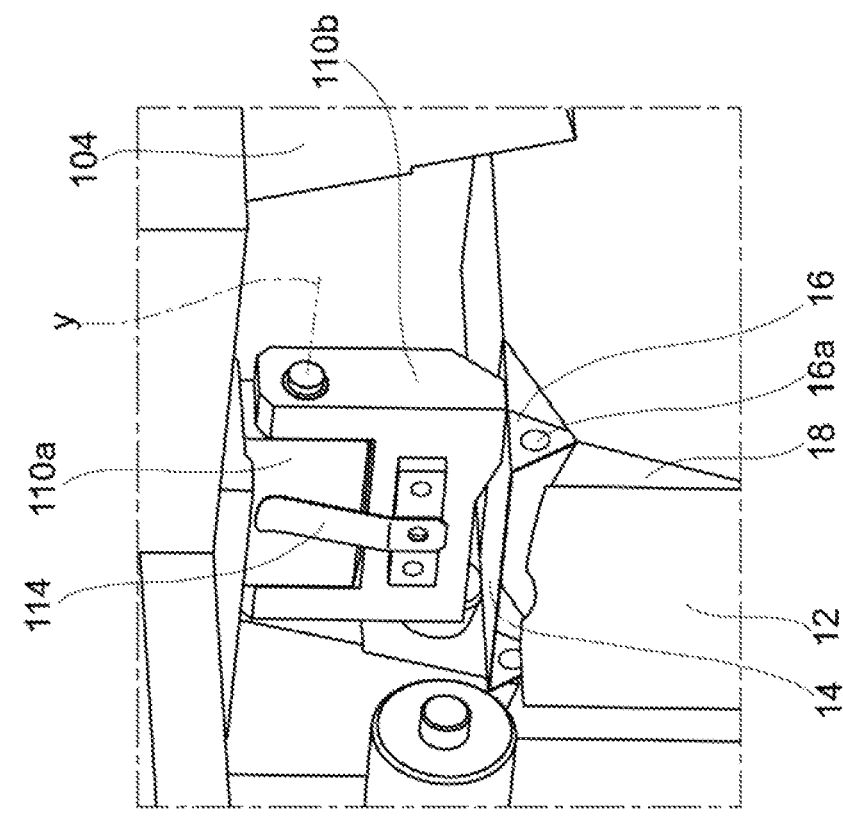
FIGS. 6 and 7 are schematic perspective views of a sliding head of the actuator according to a form of embodiment of the present invention wherein the head of the actuator is illustrated respectively according to a view corresponding to the direction of advancement of the packages and a rear view of the head itself.

FIG. 7 illustrates the head of the actuator 108 from an angle in front of the direction of advancement of the packages along the transport means 102. An optional elastic means 114 may be provided which connects the fixed part 110*a* of the head 110 to the movable part 110*b*. The position and configuration of the elastic means 114, as shown in FIG. 7, is purely by way of example.

In particular, the possibility for the movable part 110*b* to oscillate around the second transverse axis Y allows the head 110 to descend sufficiently to fold the inclined wall 14 into the inside of the box 9, following at least partially the movement of the box 9 along the means of transport, without impeding it. In particular, the movable part 110*b* is able to slope in response to the contact with the package 9, adapting to the profile of the advancing package, and decreasing the resistance that the head 110 as a whole applies to the motion of such package. In this way, as there is no great resistance to the advancement motion of the latter, one avoids deformation and incorrect positioning of the package due to the head 110 countering the advancement of the package 9.

The elastic means has the function of restoring the alignment between the fixed part 110*a* and the movable part 110*b* of the head 110, once the package 9 passes beyond the head 110.

Figure 8:
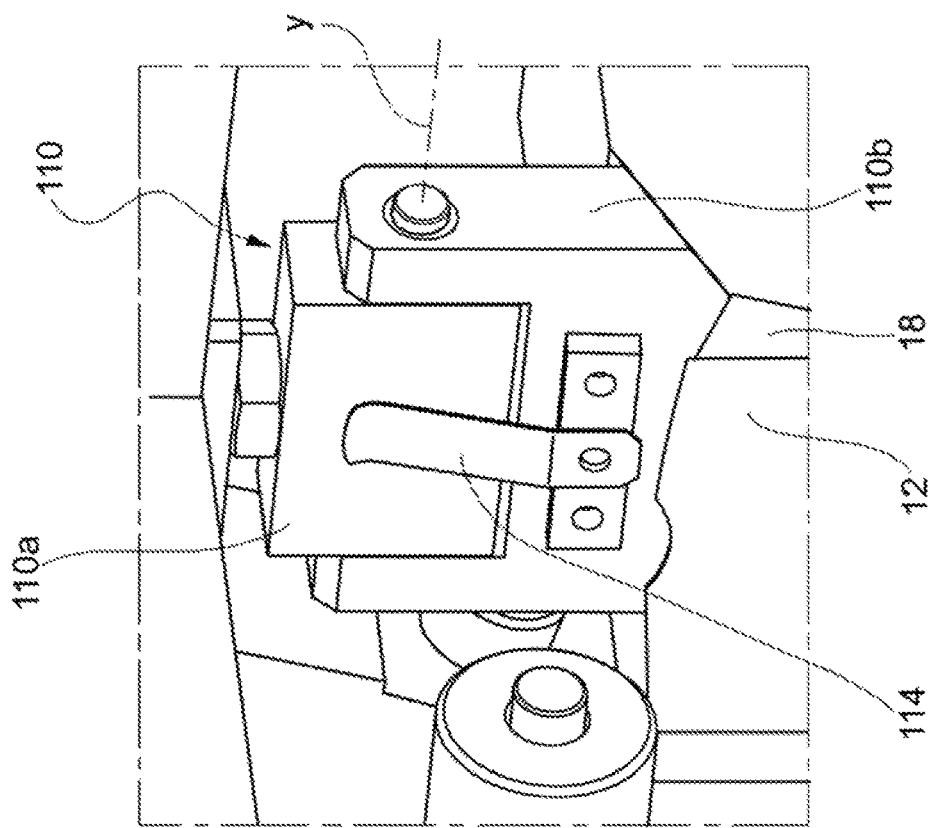
FIG. 8 is a schematic perspective view of a further step of the method according to an embodiment of the invention showing the folding step of the wall inclined toward the inside of the chamfered corner.

FIG. 8 illustrates a step of the method according to the invention, wherein the head 110 engages the inclined wall 14 and folds it inside the package 9 so that the inclined wall 10 is oriented appropriately. The chamfered end 110*c* of the head 110 allows the engagement force of the head 110 on the inclined wall to be modulated, so as to accompany the folding motion progressively.

Figure 9:
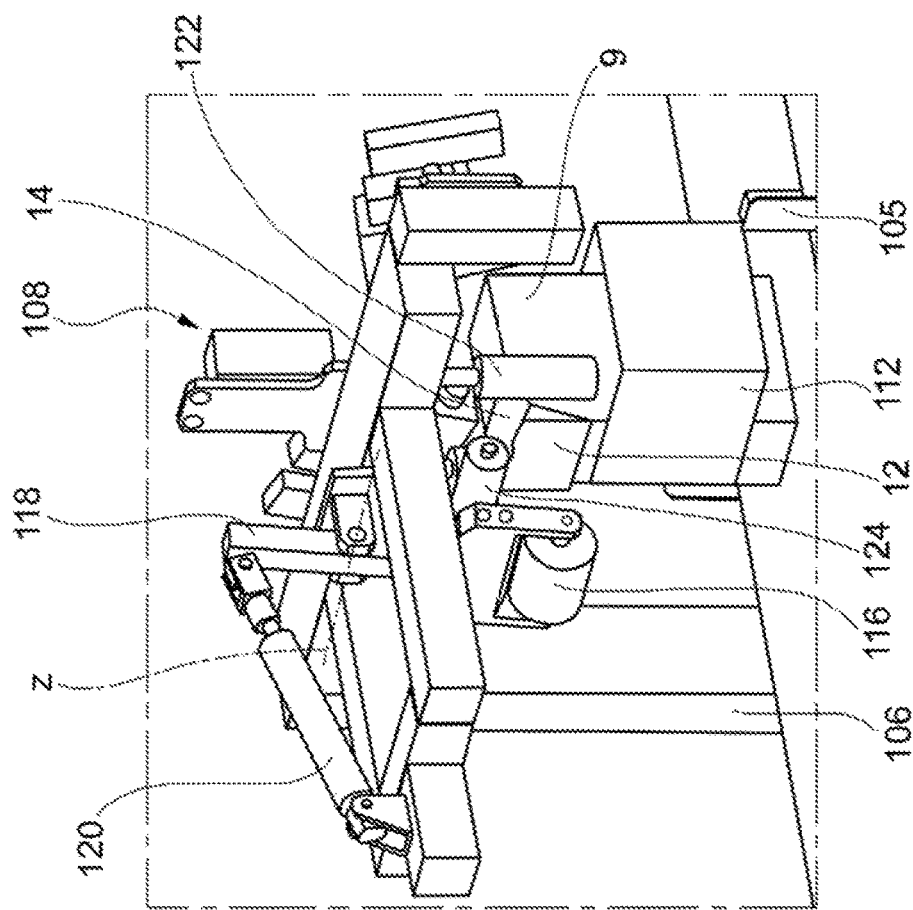
FIG. 9 is a schematic perspective view of a further step of the process according to an embodiment of the invention wherein the inclined wall is folded, and the package continues to advance along the conveyor belt to a station for folding the tongue of the spout.

Once the inclined wall 14 is folded, the package 9 continues its movement along the transport means 102 and the movable head is gradually withdrawn (as is visible in FIG. 9). At this stage, the package 9 proceeds to an abutment tool 116, adapted to impart force on the tongue 12 in the direction opposite to the direction of advancement of the package 9 along the means of transport 102.

According to one embodiment, the abutment tool 116 may be configured as a roller able to engage the tongue 12 and pushing it backwards until it is brought to abut against the inclined wall 14.

In the illustrated embodiment, the abutment tool 116 is configured as an idle roller rotating around a substantially horizontal or transverse axis.

As illustrated by way of example in FIG. 10, the abutment tool 116 is in contact with the tongue 12 of the spout and is starting to press it toward the inside of the package 9, i.e. according to a direction opposite to the direction of advancement of the package 9 along the means of transport 102.

Preferably, the abutment tool 116 is connected (in the example shown by an oscillatable rod 118) to a return means 120 (in the example shown, a damper or pneumatic cylinder), so that the abutment tool does not excessively obstruct the movement of the package 9. For example, the abutment tool may slide along at least part of the package 9, following its contour, and/or rise up so as to prevent any contact with the package.

Appropriately, the return means 120 is an actuator which raises the abutment tool 116 above the package 9 as soon as the tongue 12 has come into contact with the abutment tool 116 for a time sufficient to trigger the folding of the tongue 12 towards the inside of the chamfered corner 10. In this way, the abutment tool 116 is removed from the trajectory of the package 9, and ceases to hinder its advancement. Appropriately, the return means 120 may be activated automatically, for example by means of sensors that detect the contact of the abutment tool 116 with the tongue 12.

Appropriately, the connecting rod 118 between the abutment tool 116 and the damper 120 is able to oscillate around a third, preferably horizontal, axis Z.

Once the tongue of the spout 12 abuts the inclined wall 14, the first and second folding portions 16, 18 mutually come in contact and adhere to each other by means of the adhesive means.

Therefore, the abutment tool 116 is suitably removed from the direction of advancement of the package, which may pass beyond the automatic package closing station 100.

Optionally, a plurality of guides 122, 124 (according to a preferred embodiment, rollers or rolling bodies) are configured to engage the package 9 in its forward motion, mainly to contain it, to facilitate the folding operations and to avoid unwanted deformations. The guides 122, 124 may be horizontal and/or vertical and may be motorized or idle.

The guides 122, 124 may comprise two side guides 122 and/or a top guide 124 and may engage the package 9 while one or more of the tools described above come in contact therewith. The guides 122, 124 may be movable so as to move away from the package 9 when they are not needed (so as not to block the advancement), and to come closer when the package is to undergo an impact. In the illustrated example, the guides 122, 124 surround and contain the package 9 when the abutment tool 116 impacts the tongue 12 frontally. Optionally, an adhesive label may be further applied on the tongue 12 (according to a manner not shown).

According to a preferred embodiment, a "low-tack" adhesive, of the type known as "Fugitive Glue", may be used as an adhesive, which produces a reversible, non-permanent union.

The advantage obtained is to have an automated method for closing a succession of packages 9 for bulk material, which has a minimum impact on the advancement motion of the package, avoiding deformation and unwanted bulging, and assuring the sealing of the enclosure.

Several aspects and embodiments of an apparatus have been described and a method for closing a package having a spout according to the invention has been described. It is understood that each embodiment may be combined with any other embodiment. The invention, moreover, is not limited to the described embodiments, but may be varied within the scope defined by the appended claims.

The invention claimed is:

1. A method of closing packages (9) having a movable pouring spout, the method comprising the step of applying an adhesive on one or both portions of a first pair of folding portions (16), each movable integrally with an inclined wall (14) of a chamfered corner (10) of the package (9), said first folding portions (16) being coupled to a second pair of folding portions (18) which are movable integrally with an oscillatable tongue (12) of the spout, whereby the second portions (18) adhere to the first portions (16) when the tongue (12) moves toward the inclined wall (14); the method further comprising the steps of:
   a) providing an actuator (108) adapted to impart a fold to the inclined wall (14), the actuator having a head (110);
   b) causing the package (9) to advance toward the actuator (108), with the inclined wall (14) in an undeformed condition frontally facing the direction of advancement;
   c) lowering the actuator (108) when it is above, and corresponding to, the undeformed inclined wall (14), thereby bringing the head (110) in contact with said inclined wall (14); and
   d) continuing to lower the head (110), until the head gives the inclined wall (14) a predetermined inclination towards the inside of the chamfered corner (10).

2. A method according to claim 1, wherein the adhesive is applied on faces of the first folding portions (16) facing the outside of the package (9).

3. A method according to claim 1, wherein the adhesive is sprayed on the first folding portions (16) by a pair of dispensers (104) located on opposite sides with respect to a path along which the packages advance.

4. A method according to claim 1, wherein the head (110) comprises a movable part (110b), oscillatable in the direction of advancement of the package (9).

5. A method according to claim 1, comprising the step of frontally impacting the tongue (12) of the spout with an abutment tool (116), so as to fold the tongue (12) towards the inside of the chamfered corner (10).

6. A method according to claim 5, comprising the step of sliding the abutment tool (116) along at least part of the package (9), following a contour thereof, and/or raising said abutment tool (116) so as to prevent it from further contacting the package (9).

7. A method according to claim 1, comprising the steps of providing vertical guides (122) and/or horizontal guides (124) and bringing said guides in contact with lateral faces and/or a top face of the package (9), so as to contain deformations caused by the folding process.

8. A method according to claim 1, comprising the step of folding the tongue (12) towards the inside of the chamfered corner (10) until the second folding portions (18) at least partially overlap the first folding portions (16), so as to cause mutual adhesion.

9. A method of closing packages (9) having a movable pouring spout, the method comprising the step of applying an adhesive on one or both portions of a first pair of folding portions (16), each movable integrally with an inclined wall (14) of a chamfered corner (10) of the package (9), said first folding portions (16) being coupled to a second pair of folding portions (18) which are movable integrally with an oscillatable tongue (12) of the spout, whereby the second portions (18) adhere to the first portions (16) when the tongue (12) moves toward the inclined wall (14); the method further comprising the steps of:
   frontally impacting the tongue (12) of the spout with an abutment tool (116), so as to fold the tongue (12) towards the inside of the chamfered corner (10); and
   sliding the abutment tool (116) along at least part of the package (9), following a contour thereof, and/or raising said abutment tool (116) so as to prevent it from further contacting the package (9).

10. A method according to claim 9, wherein the adhesive is applied on faces of the first folding portions (16) facing the outside of the package (9).

11. A method according to claim 9, wherein the adhesive is sprayed on the first folding portions (16) by a pair of dispensers (104) located on opposite sides with respect to a path along which the packages advance.

12. A method according to claim 9, further comprising the steps of:
   a) providing an actuator (108) adapted to impart a fold to the inclined wall (14), the actuator having a head (110);
   b) causing the package (9) to advance toward the actuator (108), with the inclined wall (14) in an undeformed condition frontally facing the direction of advancement;
   c) lowering the actuator (108) when it is above, and corresponding to, the undeformed inclined wall (14), thereby bringing the head (110) in contact with said inclined wall (14); and
   d) continuing to lower the head (110), until the head gives the inclined wall (14) a predetermined inclination towards the inside of the chamfered corner (10).

13. A method according to claim 12, wherein the head (110) comprises a movable part (110b), oscillatable in the direction of advancement of the package (9).

14. A method according to claim 9, comprising the steps of providing vertical guides (122) and/or horizontal guides (124) and bringing said guides in contact with lateral faces and/or a top face of the package (9), so as to contain deformations caused by the folding process.

15. A method according to claim 9, comprising the step of folding the tongue (12) towards the inside of the chamfered corner (10) until the second folding portions (18) at least partially overlap the first folding portions (16), so as to cause mutual adhesion.

* * * * *